(12) United States Patent
Skerritt (10) Patent No.: US 7,936,672 B2
(45) Date of Patent: May 3, 2011

(54) SYSTEM AND METHOD FOR BUFFER MANAGEMENT IN A PACKET-BASED NETWORK

(75) Inventor: Michael Skerritt, Oak Hill, VA (US)

(73) Assignee: Juniper Networks, Inc., Sunnyvale, CA (US)

( * ) Notice: Subject to any disclaimer, the term of this patent is extended or adjusted under 35 U.S.C. 154(b) by 461 days.

(21) Appl. No.: 10/530,812

(22) PCT Filed: Oct. 9, 2003

(86) PCT No.: PCT/US03/32155
§ 371 (c)(1),
(2), (4) Date: Nov. 16, 2005

(87) PCT Pub. No.: WO2004/034627
PCT Pub. Date: Apr. 22, 2004

(65) Prior Publication Data
US 2006/0109789 A1      May 25, 2006

Related U.S. Application Data

(60) Provisional application No. 60/416,941, filed on Oct. 9, 2002.

(51) Int. Cl.
*G04B 19/06*      (2006.01)

(52) U.S. Cl. .......................... 370/232; 370/252; 370/328
(58) Field of Classification Search .................. 370/238, 370/229, 230.1, 231, 252
See application file for complete search history.

(56) References Cited

U.S. PATENT DOCUMENTS

| | | | |
|---|---|---|---|
| 5,517,521 A * | 5/1996 | Strawn .......................... 375/219 |
| 5,978,355 A | 11/1999 | Yamaguchi |
| 6,683,889 B1 | 1/2004 | Schaffer et al. |
| 6,839,321 B1 * | 1/2005 | Chiruvolu .................. 370/230.1 |
| 6,859,460 B1 * | 2/2005 | Chen ............................ 370/412 |
| 6,937,603 B1 * | 8/2005 | Miao ......................... 370/395.62 |
| 2002/0009051 A1 | 1/2002 | Cloonan |
| 2002/0080823 A1 | 6/2002 | Wolf et al. |
| 2003/0099199 A1 | 5/2003 | Kiremidjian et al. |

* cited by examiner

*Primary Examiner* — Donald L Mills
*Assistant Examiner* — Henry Baron
(74) *Attorney, Agent, or Firm* — Miles & Stockbridge P.C.

(57) ABSTRACT

A communication system for use with a packet-based network is disclosed. A first node is configured to transmit circuit data in data packets across the network. A second node is configured to receive the data packets from the network and serialize the synchronous data. The second node comprises a configurable buffer, the buffer being configurable to adjust to network packet delay variance through analysis of packet delay variance as measured over at least one period of time.

4 Claims, 6 Drawing Sheets

SYSTEM AND METHOD FOR BUFFER MANAGEMENT IN A PACKET-BASED NETWORK

CROSS-REFERENCE TO RELATED APPLICATION

This application claims the benefit of U.S. provisional patent application Ser. No. 60/416,941 filed Oct. 9, 2002, which is hereby incorporated by reference.

INTRODUCTION

The primary goal in any network is to transport user data from one end of the network to the other without errors. This is true whether the user traffic be circuit data, for example, in a Time Division Multiplex (TDM) network or data packets in an Internet Protocol (IP) network. There are, however, different considerations for managing errors based on these data types.

It is common for circuit data to be transported across a TDM network, where regular time slots are reserved in the network for carrying users' data. A TDM network generally comprises at least one transmitting Data Terminal Equipment (DTE) clock that is synchronous to at least one destination DTE clock. As long as the network is able faithfully to carry all of the transmitting DTE's traffic through the network, there is no reason to expect errors to occur when recovering the circuit data.

To accommodate any changes in the data arrival rate, buffers found in selected nodes on the ends of the network accept data and temporarily store it prior to transmission to the destination DTE. The destination DTE's clock sets the retrieval rate of data from the buffer. Buffers are intended to accommodate variations in the arrival of data from the network so that the destination DTE always receives a constant stream of data, thereby eliminating any errors due to frequency offset between the transmitting clock and the receiving clock and other network conditions.

The size of the buffer depends on the amount of delay variance that is associated with transport of data through the network. The larger the delay variance, the larger the buffer needs to be in order to handle these network delay variations. Because a TDM network is constrained to sending data in regular time slots, variations in the arrival rate of circuit data to the destination node are generally very limited. Any delay variance that may exist in a TDM network can usually be quantified and bounded in a way that buffer sizes can be established without the need for frequent, subsequent modifications.

Relative to TDM network delay variance, IP network delay variance can be very large. In particular, IP network delay variance is due to the large packet delay variance (PDV) that occurs in an IP network. The large PDV in an IP network can be attributed mainly to four underlying characteristics of an IP network.

Firstly, data in an IP network travel in packets, which may range in size from 32 bytes to 1500 bytes. At the destination DTE of an IP network, data arrive in "bursts" according to packet size. For example, the DTE may receive a burst of 1200 bytes of data, followed by a delay, and then another burst of 1200 bytes of data. In comparison to TDM networks, this represents many orders of magnitude difference in the "chunkiness" of the network transport.

Secondly, network congestion can lead to delayed or dropped packets. Packets are routed through an IP network using a "best effort" approach, and often there is much more data entering the network than can be reliably carried through it. Due to network congestion, packets with the same origin and destination network nodes may take alternative routes, which may vary transmission times and increase PDV. User traffic may either be delayed waiting for an opportunity to traverse the network, or be discarded altogether.

Thirdly, packets may have variable sizes. In situations above where there is network congestion, it is possible that data packets are held at a node on the network while higher priority traffic is transmitted. This higher priority traffic can vary widely in packet size, which will have an affect on PDV, and therefore network delay variance.

Fourthly, while IP networks' traffic delay and congestion profiles may vary over the short term as described above, delay and congestion profiles can also vary significantly over the long term. For example, there may be increased traffic during a certain time of day, a particular day of the week, or even seasonally.

These four factors, as well as others, contribute to continuous changes in network PDV, making efficient buffer management very challenging.

In addition to the difficulties arising from PDV, further problems develop when the destination DTE's clock is not properly synchronized with the transmitting DTE's clock. When these clocks are not synchronized, the rate at which packets arrive in the buffer will conflict with the rate at which packets are removed from the buffer, resulting in errors caused by missing or overwritten packets. Eventually, an unwanted buffer overflow or underflow event may transpire which dumps any existing data in the buffer and resets the buffer to an initial state. Proper buffer management would correct any of these unwanted tendencies.

The present invention provides a system and method for buffer management that allows the buffer size to be adjusted to accommodate changes in PDV. Smooth and low error data recovery at the destination DTE of an IP network may thus be achieved.

BRIEF DESCRIPTION OF THE DRAWINGS

In the drawings, where like reference numbers refer to like elements throughout the several views.

DETAILED DESCRIPTION

Increases and decreases in PDV of an IP network can usually be attributed to one or more of the factors identified above, as well as others. The system of the present invention examines the effects of these factors on PDV to set the optimal buffer size to support error-free and smooth circuit emulation services over an IP network.

Figure 1:
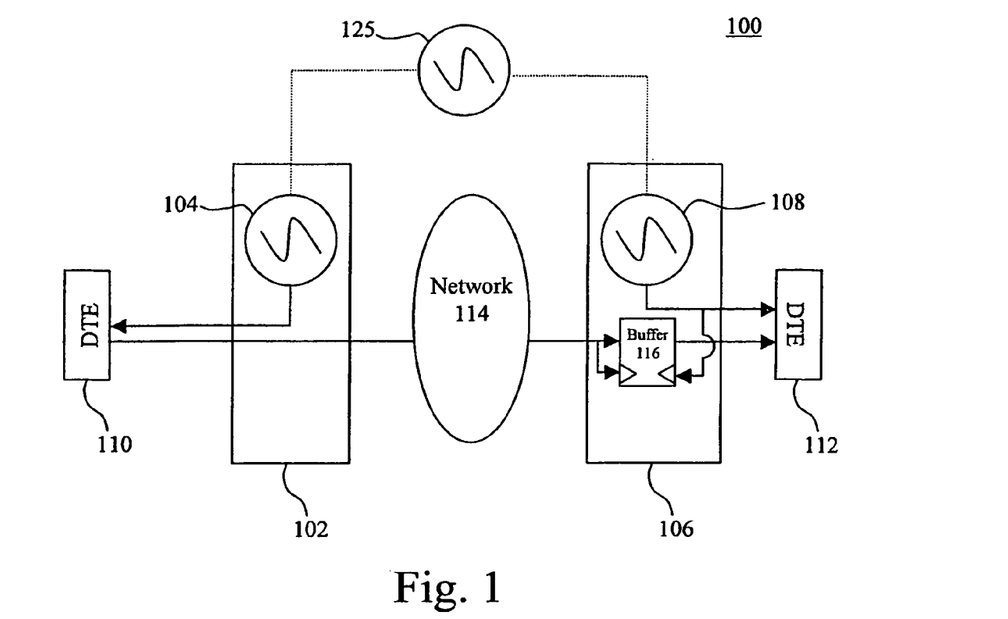
FIG. 1 is a block diagram of a communication system in accordance with the present invention.

Referring now to FIG. 1, a communication system 100 comprises a transmitting node 102, a destination node 106, and an IP network 114 for communication therebetween.

Transmitting node 102 facilitates the transmission of bit- or byte-synchronous circuit data through IP network 114. A transmitting Data Terminal Equipment (DTE) 110 provides circuit data to node 102 for transport as packetized data over the IP network. DTE 110 is the start of the data circuit. DTE 110 may derive its transmitting frequency from clock 104 of transmitting node 102. It should be appreciated that in various embodiments, clock 104 may be either a voltage controlled oscillator or a clock signal from another clock source. In one embodiment, clock 104 may be synchronized with a highly accurate master clock 125. It should still further be appreciated that DTE 110 may generate its own transmitting clock signal.

Destination node 106 facilitates the reception of bit- or byte-synchronous circuit data from IP network 114. Node 106 comprises at least one port and associated receive buffer 116 for receiving the packetized circuit data from IP network 114. Buffer 116 is a highly configurable buffer that adjusts according to user-defined settings or automatic settings in accordance with the present invention and described herein. As data packets arrive from IP network 114, they are received in buffer 116. Data packets are pulled from buffer 116 in accordance with the frequency of a clock 108 of destination node 106, and transmitted as bit- or byte-synchronous circuit data to receiving DTE 112. It should be appreciated that in various embodiments, clock 108 may be either a voltage controlled oscillator or a clock signal from some other clock source. In one embodiment, clock signal 108 may be synchronized with master clock 125 under nominal operating conditions, either independently, or in addition to clock 104. DTE 112 completes the data circuit.

It should be appreciated that the present invention is operatively independent of bit- or byte-synchronous protocols such as, for example, legacy protocols.

Figure 2:
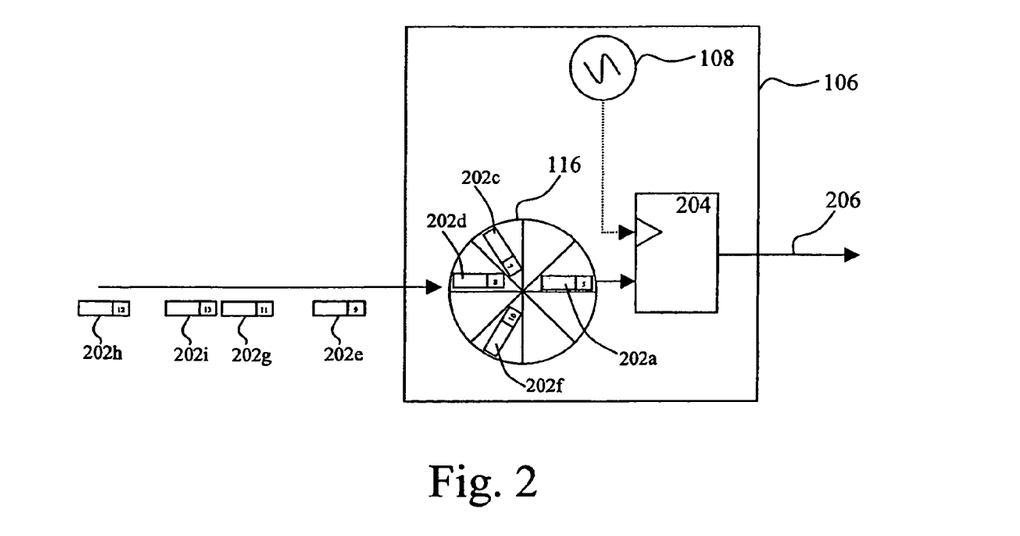
FIG. 2 is a block diagram of a destination node of the communication system of FIG. 1.

Referring now to a preferred embodiment of the present invention, FIG. 2 shows destination node 106 in greater detail. Packets 202 arriving from IP network 114 are sequenced according to the bit- or byte-synchronous data that is contained within each packet. Due to network delay, packets 202 may be received in non-sequential order, with random delay interspersed, as shown by packets 202a through 202i. Receiving buffer 116 accepts packets and stores them for transmission to destination DTE 112. Buffer 116 is preferably architectured for manipulation in a temporary memory storage area that allows fast read and write routines such as, for example, random access memory (RAM). However, it should be appreciated that buffer 116 may be implemented on any suitable storage medium.

Serializer 204 pulls data packets 202 from buffer 116 in synchronization with clock 108 such that data is sent to destination DTE 112 at a constant and smooth rate. Retrieval of buffered packets 202 by serializer 204 preferably is performed in synchronization with clock 104 of source node 102, as clock 104 and clock 108 are preferably synchronized, thereby providing a continuous and smooth bit- or byte-synchronous data stream 206 to destination DTE 112 regardless of the PDV of network 114.

It is important to note the difference between buffer packet delay and network packet delay. Buffer packet delay is the delay a packet of data encounters from the time it enters buffer 116 to the time it is pulled from buffer 116 by serializer 204. Network packet delay is the delay a packet of data encounters from the time it is transmitted from node 102 to the time it is received at node 106. When reference is made to PDV, it is the network packet delay variance that is being referred to. An inverse relationship exists between network packet delay and buffer packet delay. To avoid confusion, hereinafter the term "buffer depth" is synonymous with buffer packet delay.

The size of buffer 116 depends on the amount of network delay variance that is associated with transport of data through network 114. The larger the delay variance, the larger the buffer is needed to handle the variations. However, as discussed above, network delay variance is constantly changing. The present invention contemplates dynamically changing the buffer size in accordance with current network conditions, in particular, packet delay variance.

In the present invention, buffer 116 may be adjusted by three configurable settings: buff set, buff max, and buff min.

The buff set parameter is a time measurement that determines how much time will pass, and consequently how much data will be accumulated from IP network 114, before serializer 204 starts to pull data from the buffer. If the buff set parameter is not large enough to handle the PDV of network 114, then serializer 204 will attempt to pull packets 202 before they have arrived in buffer 116, and errors will occur in data stream 206. This is called an "underflow event." Conversely, if the buff set parameter is too large, then serializer 204 will not pull packets 202 out of buffer 116 before they are overwritten by newly arriving packets 202, and errors will result in circuit data stream 206, otherwise known as an "underflow event."

Because buffer 116 is constrained in size, time boundaries are set to indicate impending overflow or underflow events. The present invention sets these boundaries to prevent underflow and overflow events by taking corrective action.

The buff max parameter is a time measurement that sets an upper bound on the average buffer depth. The average buffer depth is determined by averaging the instantaneous buffer depth over a determined period of time. When the average buffer depth reaches this maximum level, it is an indication that buffer 116 is close to an overload of data packets 202, and a buffer overflow event may soon transpire.

The buff min parameter is a time measurement that sets a lower bound on the average buffer depth. When the average buffer depth reaches this minimum level, it is an indication that buffer 116 is close to exhaustion, and a buffer underflow event may soon transpire.

The present inventive system can automatically recognize PDV trends over periods of time and automatically adjust the buff set, buff max, and/or buff min parameters accordingly in order to configure buffer 116 to conditions on network 114, specific characteristics of DTE 112, etc. When DTE clocks 104, 108 are not synchronized, there will be an increase or decrease in the rate of data arriving at buffer 116 relative to the rate at which data are removed. If this mismatched frequency condition continues long enough, the average buffer depth will reach either the buff max or buff min configured levels, and buffer 116 must be dumped and refilled according to the buff set parameter. As discussed above, these correction events are referred to as buffer overflow and buffer underflow events, respectively. The difference between the buff set and each buff max and buff min parameter determines the amount of time the circuit will run with a low error rate before a buffer correction occurs. A buffer overflow event or buffer underflow event results in data loss, and if repeatedly occurring, yields an undesirable high error rate.

A sample is a series of instantaneous measurements of the buffer depth that are updated on a per packet arrival basis. The average, maximum, and minimum buffer depth measurements may be calculated from the instantaneous measurements.

Figure 3:
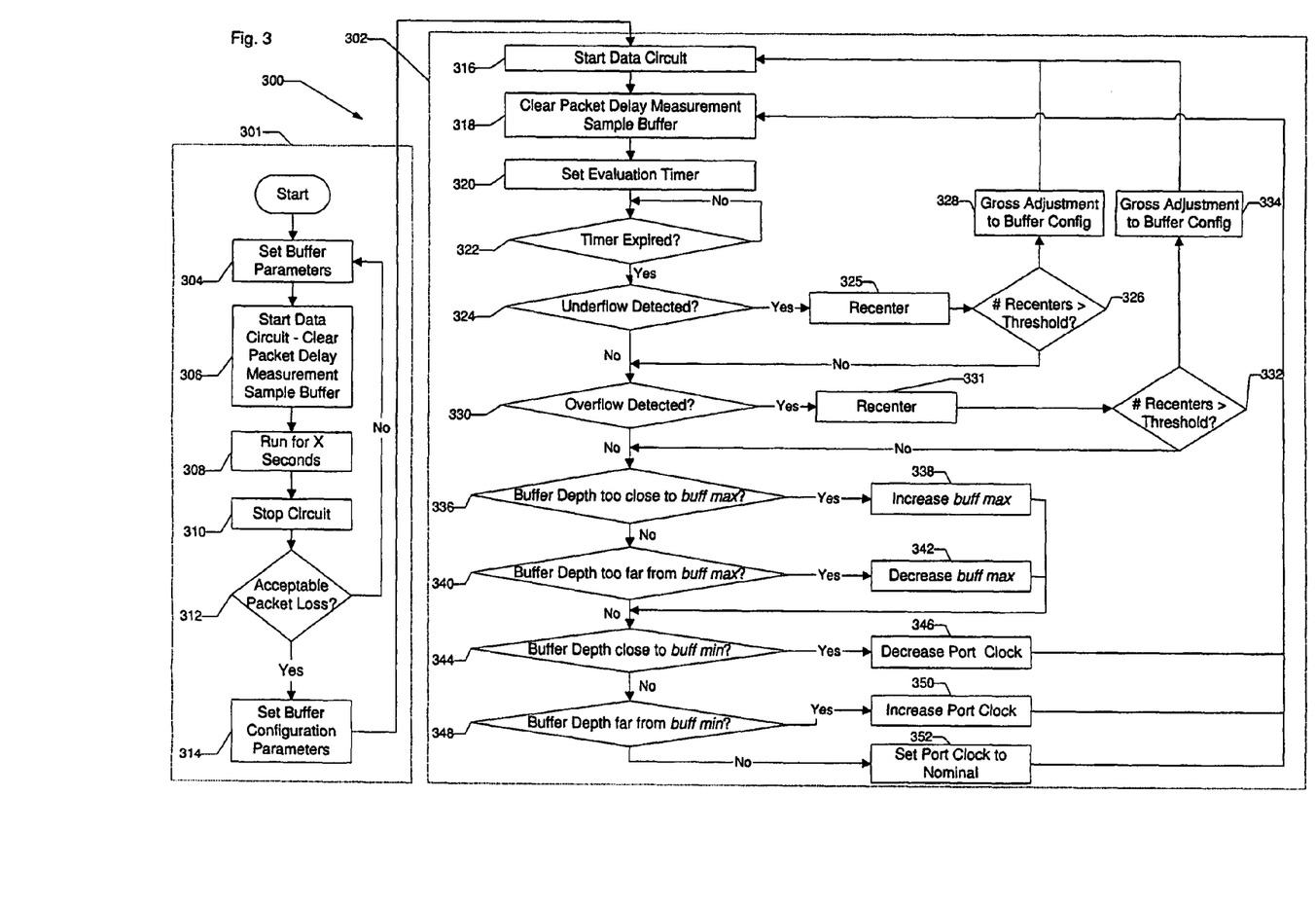
FIG. 3 is a flow chart showing an algorithm for buffer management in accordance with the present invention.

FIG. 3 shows a flow chart of control flow for a buffer management process 300 of the present invention. In one embodiment, process 300 comprises a first phase 301 (hereinafter referred to as "Phase I") and a second phase 302 (hereinafter referred to as "Phase II"). Phase I 301 includes monitoring the behavior of network 114 and corresponding PDV behavior characteristics for setting appropriate short-term values for buff set, buff max, and buff min parameters. Phase II 302 includes continually monitoring the average buffer depth to determine if changes to the buffer parameters are necessary, and if so, implementing those changes so that buffer 116 is optimally adjusted over the long-term.

Phase I 301 begins at control block 304 with the buffer parameters buff set, buff max, and buff min initialized, preferably to user-configured settings. At control block 304, the behavior of IP network 114 has not yet been monitored, and generally very little information relating to network performance is available. The buff set, buff max, and buff min parameters are preferably set to extreme levels in order to accommodate a large PDV when monitoring fill conditions of buffer 116. At control block 306, the data circuit is initiated and any existing buffer depth measurement samples are cleared.

At control block 308, buffer 116 is monitored for a predetermined, preferably user specified, period of time in order to acquire initial measurements of instantaneous buffer depths. The time period may be set using a port parameter, for example. Upon expiration of the time period, the data circuit is stopped at control block 310. At decision block 312, the sample is compared with the current buffer parameter settings to determine if the buffer exceeds the buff min to buff max parameter thresholds.

If it is determined that too many instantaneous buffer depth measurements exceed the parameter threshold settings, then Phase I 301 is repeated by returning to control block 304, whereby the initial user defined settings are reset to widen the buff min to buff max window. If it is determined at step 312 that enough measurements fall within the buffer parameter settings, then buffer parameters buff set, buff max, and buff min are sufficiently optimally configured at control block 314 according to the buffer depth sample examined at decision block 312. It is preferable that these optimal buffer parameter settings are automatically configured by node 106. It should be noted that these settings should not exceed any special user-designed settings configured for this port of node 106.

Proceeding to Phase II 302 and into the long-term operational mode, the data circuit is restarted at control block 316. At control block 318 the legacy buffer depth sample is cleared so that new data may be collected. A user-configured evaluation timer is set at control block 320. Upon start of the timer, decision block 322 loops back onto itself while the timer has not expired, allowing buffer 116 to accumulate data packets for a buffer depth sample. Upon expiration of the timer, the buffer depth sample is complete and ready for analysis.

The buffer depth sample is analyzed for at least one underflow buffer event at control block 324. A buffer underflow condition may be detected as a condition in which an instantaneous buffer depth measurement within the sample exceeds (is less than) the buff min parameter setting.

At an underflow event, buffer 116 re-centers at step 325 by discarding any remaining data packets 202 in buffer 116 and starts "fresh" by accumulating new packets 202. These new packets 202 are not pulled from buffer 116 until the buff set parameter is met.

If an underflow event is detected at decision block 324 and the buffer re-centered at step 325, the number of re-centers is compared to a predefined, preferably user-defined, threshold at decision block 326. If the actual number of re-centers meets or exceeds the threshold, then gross adjustments are made to buffer configuration parameters buff set, buff max, and/or buff min at control block 328 to prevent further underflow events from transpiring. Because large amounts of data may be lost when there are a large number of re-centers, control block 328 loops back to control block 316 to initiate a retransmission of the circuit data.

If it is determined that there is no underflow event at control block 324, or it is determined that the number of re-centers does not meet or exceed the re-centering threshold at decision block 326, then the buffer depth sample is inspected at decision block 330 to determine if at least one overflow event has occurred. An overflow condition may be detected as a condition in which an instantaneous buffer depth measurement exceeds the buff max parameter setting within the sample. If an overflow event is identified at decision block 330, the buffer is re-centered at step 331. The number of re-centers is compared to a user-specified threshold at decision block 332. This threshold is preferably the same as the underflow threshold in step 326. However, different thresholds for overflow and underflow events may be used in steps 326 and 332. If the actual number of overflow re-centers meets or exceeds the threshold, then gross adjustments are made to the buffer configuration parameters buff set, buff max, and/or buff min at control block 334. Again, because large amounts of data may be lost when there are a large number of re-centers, control block 334 loops back to control block 316 to initiate a retransmission of the circuit data.

If there are no indications of overflow at decision block 330, or if it is determined that the number of overflow re-centers does not meet or exceed the re-centering threshold at decision block 332, the buffer depth sample is compared to the buff max parameter at decision block 336. If it is determined that the buffer depth sample is within a first predetermined proximity threshold of the buff max parameter, indicating that it is too close to the buff max parameter and an overflow event is imminent, then the buff max setting is increased at control block 338 to avert any impending overflow event. If not, the buff max parameter remains at its current setting.

Subsequently, the buffer depth sample is compared to a second predetermined proximity threshold of the buff max parameter at decision block 340. If it is determined that the buffer depth sample is outside the second proximity threshold, indicating that the buffer depth sample is too remote from the buff max parameter setting, then control transfers to control block 342 where the buff max parameter setting is decreased.

Whether a change to the buff max parameter is made or not, the buffer depth sample is compared to the buff min parameter at decision block 344. Similar to earlier in the control flow, the sample is compared to a first predetermined proximity threshold, but it is now a proximity threshold of the buff min parameter. The first proximity threshold of the buff min parameter used in control block 344 may be the same of the first proximity threshold of the buff max parameter used in control block 336; however, independent proximity thresholds may be used. If the buffer depth sample is within the first proximity threshold, indicating that the sample is too close to the buff min parameter, then the frequency of port clock 108 is decreased to decelerate the rate at which packets 202 are pulled from buffer 116 by serializer 204. Consequently, the average buffer depth will increase, thereby reducing the probability of an underflow event. If at decision block 344 it is determined that the sample is not within the first proximity threshold, then a comparison of the buffer depth sample to a second proximity threshold of the buff min parameter setting is performed at decision block 348. If it is determined that the sample is outside the second proximity threshold, indicating that the buffer depth sample is too remote from the buff min setting, then control transfers to control block 350, where the frequency of clock 108 is increased to accelerate the rate at which packets 202 are pulled from buffer 116 by serializer 204. Consequently, the average buffer depth will decrease to avert any impending overflow event.

The magnitude of the adjustment to clock 108 to adapt buffer 116 to the PDV is preferably a configurable user parameter so that problems may be avoided with downstream circuit equipment clock recovery and tracking. Since a deceleration frequency shift in clock 108 will slow the data retrieval rate from buffer 116, a shift in clock 108 will also cause greater delay to the user circuit. Therefore, the capability to reduce the circuit delay when network conditions improve is desirable. Control block 352 sets port clock 108 back to its nominal frequency when the buffer depth measurement is neither too close nor too far from the buff min parameter. This may be an adjustment or non-adjustment depending on its current frequency. Following any adjustments or non-adjustments to clock 108, control is looped back to control block 318 for continuous monitoring of buffer 116.

It should be noted that FIGS. 4 through 10 plot the network packet delay along the y-axis. As the inverse relationship between buffer depth and network packet delay has been noted, the graphs correctly depict the buff min parameter above the buff max parameter.

Figure 4:
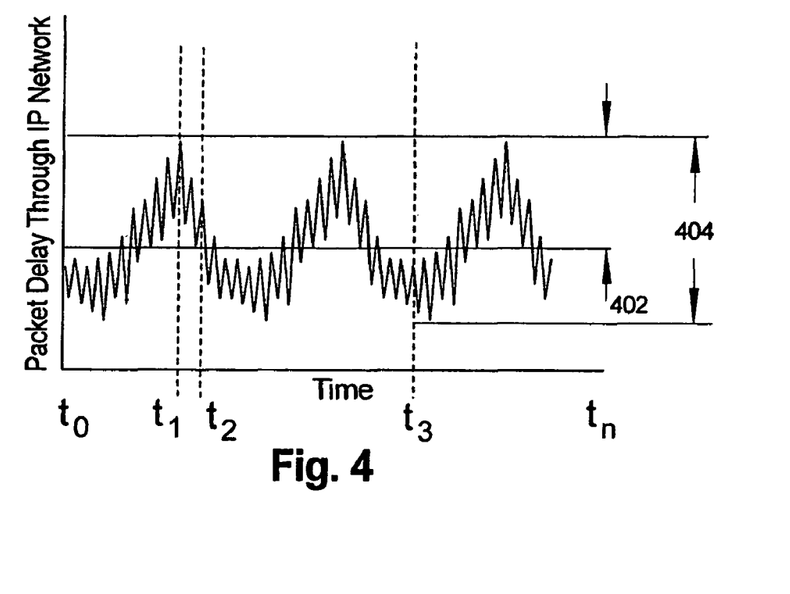
FIG. 4 is a graph showing short-term and long-term PDV on an IP network.

FIG. 4 shows a relationship between network packet delay in an IP network and time. A first buffer depth sample of PDV is taken between time $t_1$, and $t_2$, and a second buffer depth sample of PDV is taken between times $t_1$, and $t_3$. A $PDV_1$ analysis 402 of FIG. 4 shows the range of PDV of the network reflected by the first buffer depth sample and a $PDV_2$ analysis 404 shows the range of PDV of the network reflected by the second buffer depth sample. $PDV_1$ analysis 402 represents PDV in the short-term, wherein time $t_1$-$t_2$ may extend over a period of seconds or minutes. $PDV_2$ analysis 404 represents PDV in the long-term, wherein time $t_1$-$t_3$ may extend over a period much longer than time duration $t_1$-$t_2$, such as, for example, days or weeks. The increased long-term $PDV_2$ analysis 404 may be attributed to traffic patterns over the IP network which do not appear within short-term $PDV_1$ analysis 402, such as, for example, hourly, daily, weekly, or even seasonal fluctuations in network traffic that yield an increase in PDV.

If the buffer parameters are set to accommodate long-term $PDV_2$ analysis 404, those settings would be sufficient for short-term $PDV_1$ analysis 402 as well and, in the case of FIG. 4, there will be very few circuit data errors.

Figure 5:
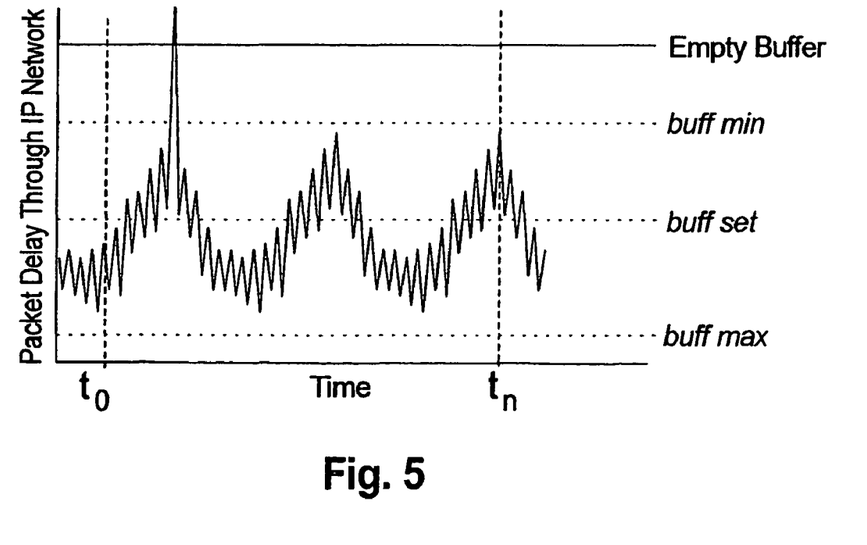
FIG. 5 is a graph showing PDV and initial user-configured buffer settings in accordance with the present invention.

FIG. 5 shows appropriate settings for buffer parameters buff set, buff max, and buff min for receiving packets in accordance with $PDV_2$ analysis 404. The buffer parameters may attain these values at control block 314 of FIG. 3. There should be few buffer underflow or overflow occurrences and thus a low error rate in the retrieved circuit signal for the time period $t_o$ to $t_n$ shown on the x-axis. However, no information on PDV is available after time $t_n$, and these parameters may not be able to accommodate changes in PDV after time $t_n$. Effectively, parameters buff set, buff max, and buff min are set to PDV in the short-term, but may need to be changed to avoid errors at a future time.

Figure 6:
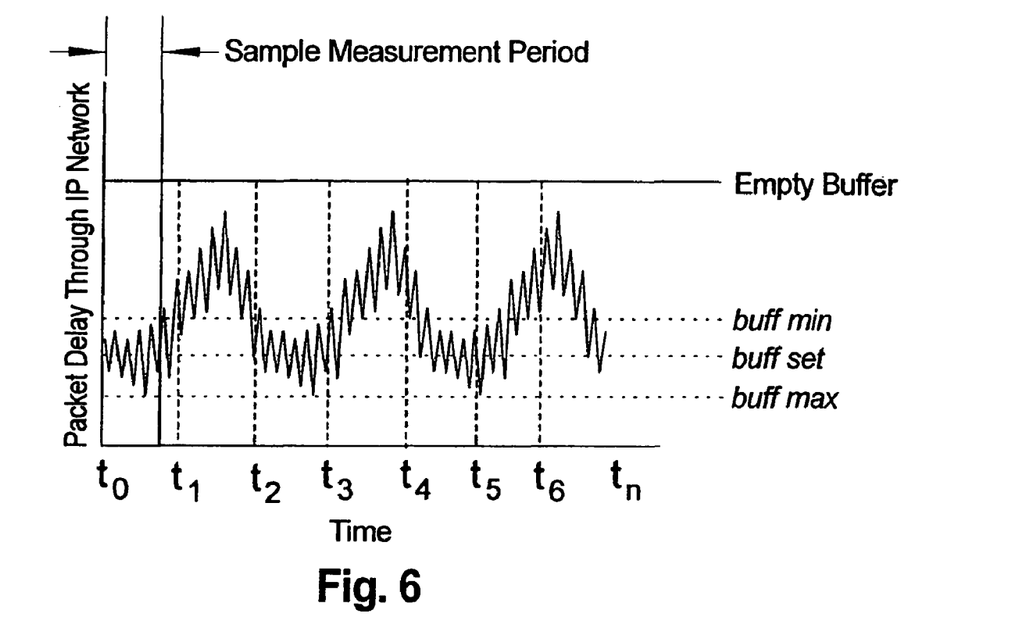
FIG. 6 is a graph showing PDV conflicting with initial, user-configured buffer settings.

FIG. 6 illustrates a case in which changes in PDV and average packet delay fall outside the buff max and buff min parameter thresholds that were set in the initial sample measurement period 600 that occurred before time $t_1$. Between periods $t_1$, to $t_2$, $t_3$ to $t_4$, and $t_5$ to $t_6$, PDV analysis shows that the buff min parameter will be exceeded, indicating that a buffer underflow event is impending, which will result in lost data packets. FIG. 6 shows the case in which the buff set, buff max and buff min parameters do not change. However, the system of the present invention solves this problem by automatically adjusting these parameters.

Decision block 344 of FIG. 3 identifies the condition shown in FIG. 6. In the present invention, once buff min is exceeded, clock 108 will decrease as shown by control block 346 in order to maintain an appropriate average buffer fill, thereby avoiding a buffer underflow event.

Figure 7:
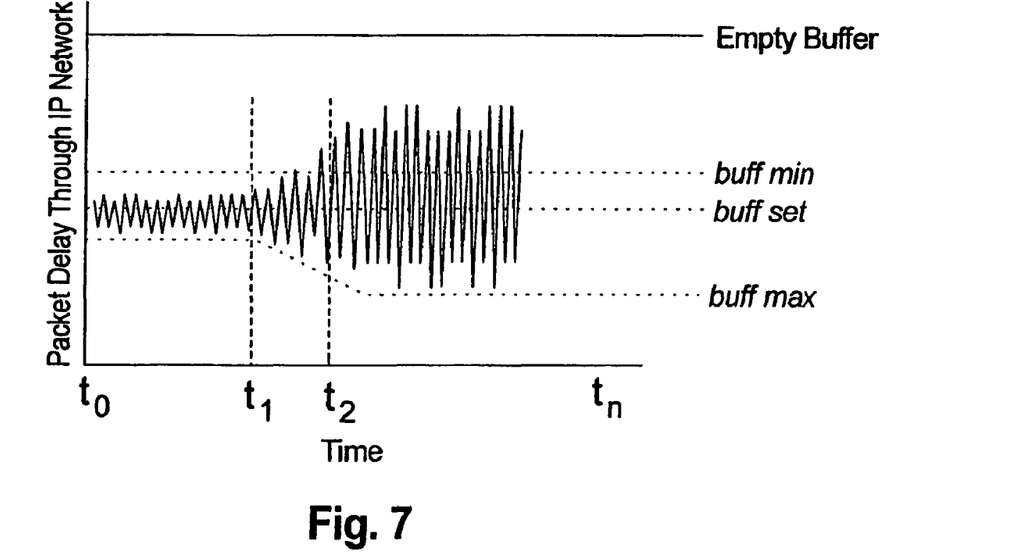
FIG. 7 is a graph showing an increase in PDV.

FIG. 7 shows a situation in which the PDV stays relatively constant until approximately doubling from time $t_1$ to $t_2$. With increasing time, the PDV increases but the average packet delay remains constant. In this situation, and in accordance with decision block 336, an increase in the buff max parameter reflects the downward shift of the buff max level represented on the graph of FIG. 7, such that the buff max threshold will not be exceeded. To accommodate the buff min parameter to this PDV, port clock 108 is slowed with, for example, a finely adjustable clock synthesizer like a Digital Data Synthesizer (DDS), at control block 346. Once the port clock 108 is slowed, buffer 116 will receive data at a rate that is faster than the data retrieval rate and, as a result, the average buffer fill will increase. Once buffer 116 contains enough data to support the difference between the buff max and buff min parameters settings, clock 108 is readjusted back to its nominal rate at control block 352 to maintain an adequate buffer fill. In one embodiment of the present invention, buff min may also be adjusted as well as buff max.

The magnitude of the changes in the buff max and buff min parameters, as well as the clock adjustment to adapt the buffer to the PDV are preferably configurable user parameters. The adjustments are made in small amounts, determined based on current PDV measurements, rather than large predetermined jumps in settings. This allows the buffer to continually adapt to changing network conditions.

Figure 8:
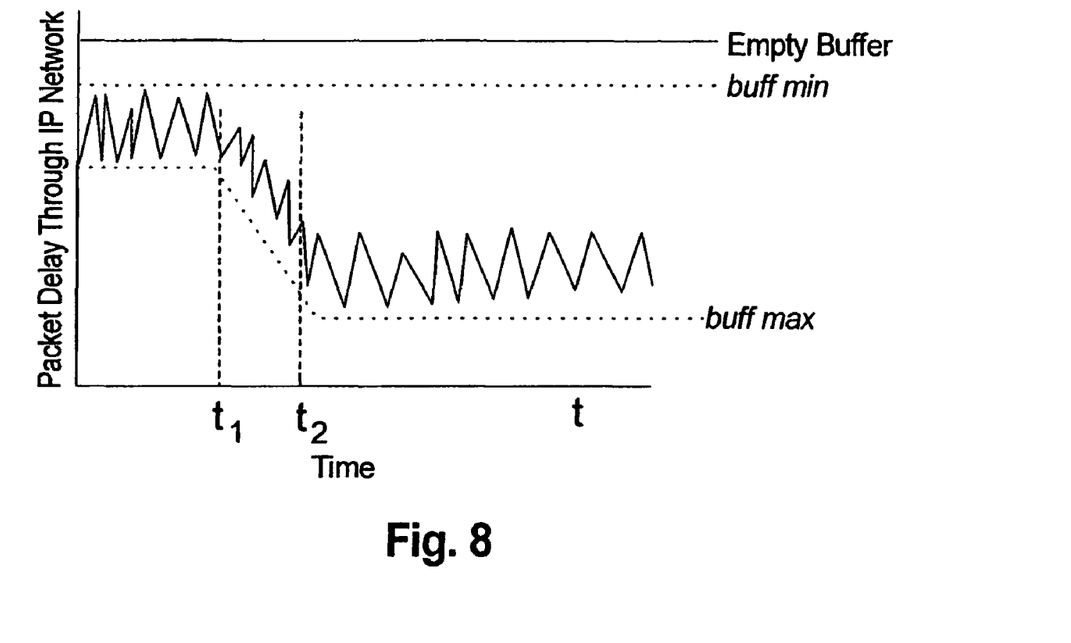
FIG. 8 is a graph showing a decrease in average network packet delay with constant variance.

FIG. 8 shows PDV analysis of a situation in which the PDV remains constant with a decrease in the average network packet delay. In this situation, the buff max parameter setting is increased with a downward shift on the graph as shown. In this scenario, however, the PDV is falling away from the buff min parameter setting. This trend is detected at decision block 348. Accordingly, the frequency of clock 108 will be increased at control block 350 so that the average buffer fill decreases to lessen the possibility of any future overflow events.

Figure 9:
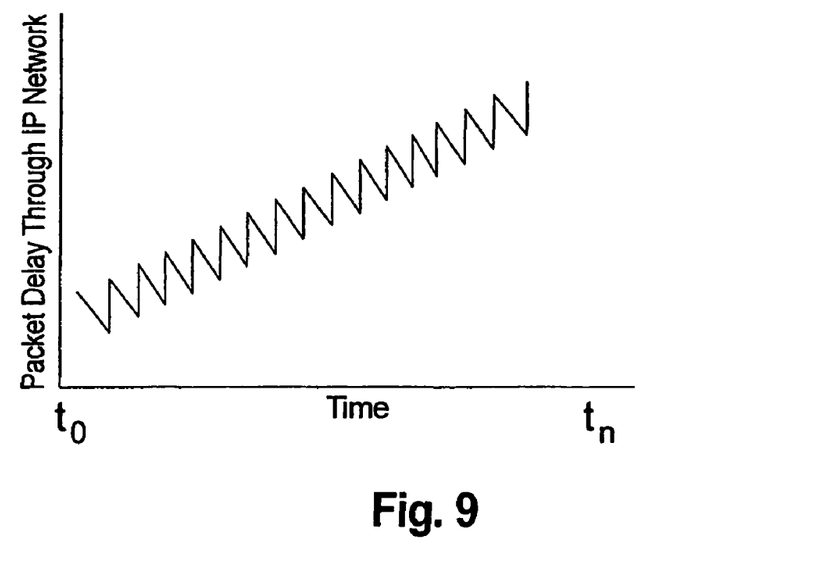
FIG. 9 is a graph showing a PDV analysis of a free-running circuit.

A PDV analysis of a continuously increasing average PDV is shown in FIG. 9. Unlike FIG. 8, the average PDV does not stabilize. A continuously increasing average PDV is an indication of a free-running clock 108, in which clock 104 lags behind clock 108. The PDV analysis of FIG. 9 is shown over the short-term.

Figure 10:
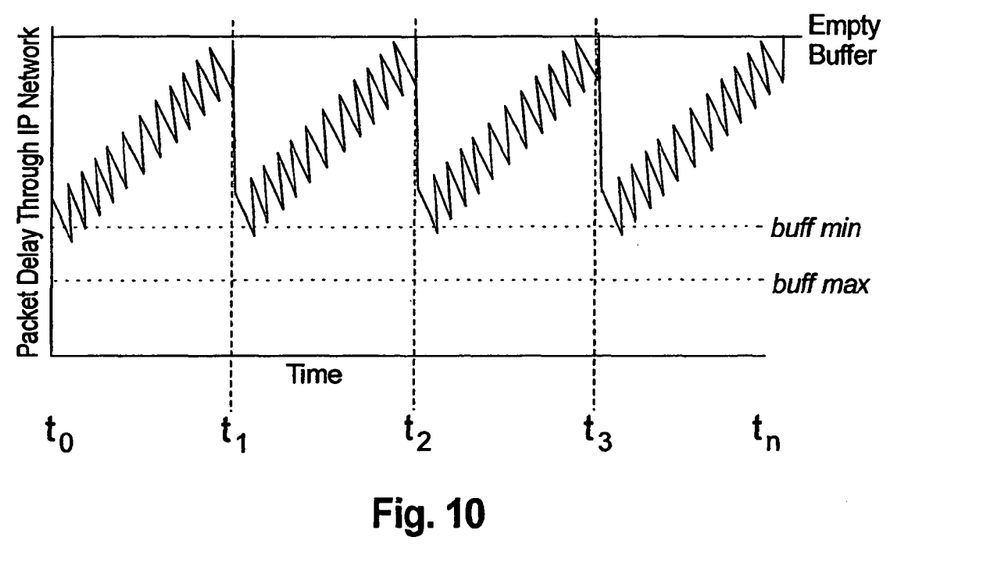
FIG. 10 is a graph showing PDV of a free-running circuit in accordance with the buffer management algorithm of the present invention.

FIG. 10 shows the resulting long-term PDV trends for a continually increasing average PDV. At times $t_1$, $t_2$, and $t_3$, buffer 116 is exhausted of data packets. Buffer underflow events transpire and the average packet delay is re-centered based on the current buffer parameter settings. These underflow re-centering events are detected at decision block 324, wherein gross adjustments to the current buffer settings may be made at block 328 to correct the parameter settings.

This is not to say, however, that the free-running port clock cannot be readjusted to lock on the frequency of the transmitting clock. A number of methods or system circuits known to one familiar in the art should be used to appropriately lock free-running clock 108, especially after a very large number of re-centers is detected.

As will be appreciated from the preceding description, the present invention can be implemented to prevent data errors in data transport due to buffer over- or under-flow. The present invention can also be used to control the total network delay in systems that require the total network delay of a data circuit to be within a specific bound. The total network delay between two DTEs is comprised of the IP network delay aggregated with the buffer delay. If the IP network portion of the delay is known, then the buffer portion, under the control of the present invention, can be used to compensate such that the desired total network delay is achieved.

In this embodiment, local and remote timestamps are included in the packets that traverse the network. Round trip delay for packets can be determined by a number of methods, as known by those skilled in the art. The IP network delay can then be estimated by dividing the round trip delay by 2. The buff set parameter can then be set to represent the difference between the desired total network delay and the IP network delay. By constantly monitoring the IP network delay portion of the total network delay, adjustments may be made to the buffer depth to keep the total network delay constant.

For example, a communication system may require that the total network delay for a data channel to be 100 milliseconds. Through the above-described calculations, it can be determined that the IP network delay is 60 ms. If the buffer depth is set to 40 ms, this achieves the desired total network delay of 100 ms. However, as time passes, the IP network delay slowly changes to 40 ms. This could happen, for example, during the night, when network traffic typically lightens. The IP network monitoring detects this and the inventive system adjusts the buffer to increase incrementally over time with the decreasing IP network delay to a value of 60 ms. At all times, the desired total network delay of 100 ms is achieved.

The present invention provides for adaptive buffering in an IP network to improve circuit reliability without the loss of bit count integrity.

While this invention has been described in conjunction with specific embodiments thereof, it is to be understood that the preferred embodiments of the invention as set forth herein, are intended to be illustrative, not limiting.

The invention claimed is:

1. A communication system for use with a packet-based network comprising:
    a first node configured to transmit data in data packets across the network; and
    a second node configured to receive the data packets from the network and serialize the data;
    wherein the second node includes a buffer, said buffer being configurable to adjust to network packet delay variance through analysis of a packet delay variance measurement, as measured over at least one period of time,
    wherein the packet delay variance measurement includes monitoring, for the at least one period of time, a buffer depth of the buffer, the buffer depth being a temporal measurement of a delay that a data packet encounters from when the data packet is received by the buffer to when the data packet is serialized,
    wherein, in a first phase of operation, a plurality of buffer parameters are set to predetermined values, and
    wherein, in a second phase of operation, in response to the monitoring of the buffer depth of the buffer, one or more of the buffer parameters having been set and a clock frequency of the second node are automatically adjusted.

2. A communication system for use with a packet-based network comprising:
    a first node configured to transmit data in data packets across the network; and
    a second node configured to receive the data packets from the network and serialize the data;
    wherein the second node includes a buffer, said buffer being configurable to adjust to network packet delay variance through analysis of a packet delay variance measurement, as measured over at least one period of time,
    wherein the packet delay variance measurement includes monitoring, for the at least one period of time, a buffer depth of the buffer, the buffer depth being a temporal measurement of a delay that a data packet encounters from when the data packet is received by the buffer to when the data packet is serialized, and
    wherein, in a second phase of operation, after a plurality of buffer parameters are set to predetermined values in a first phase of operation, the system compensates for one or more of the following: an overflow event, an underflow event, a potential overflow event, and a potential underflow event.

3. The communication system of claim 1, wherein the buffer parameters are user-set.

4. The communication system of claim 2, wherein the buffer parameters are user programmable.

* * * * *